UNITED STATES PATENT OFFICE.

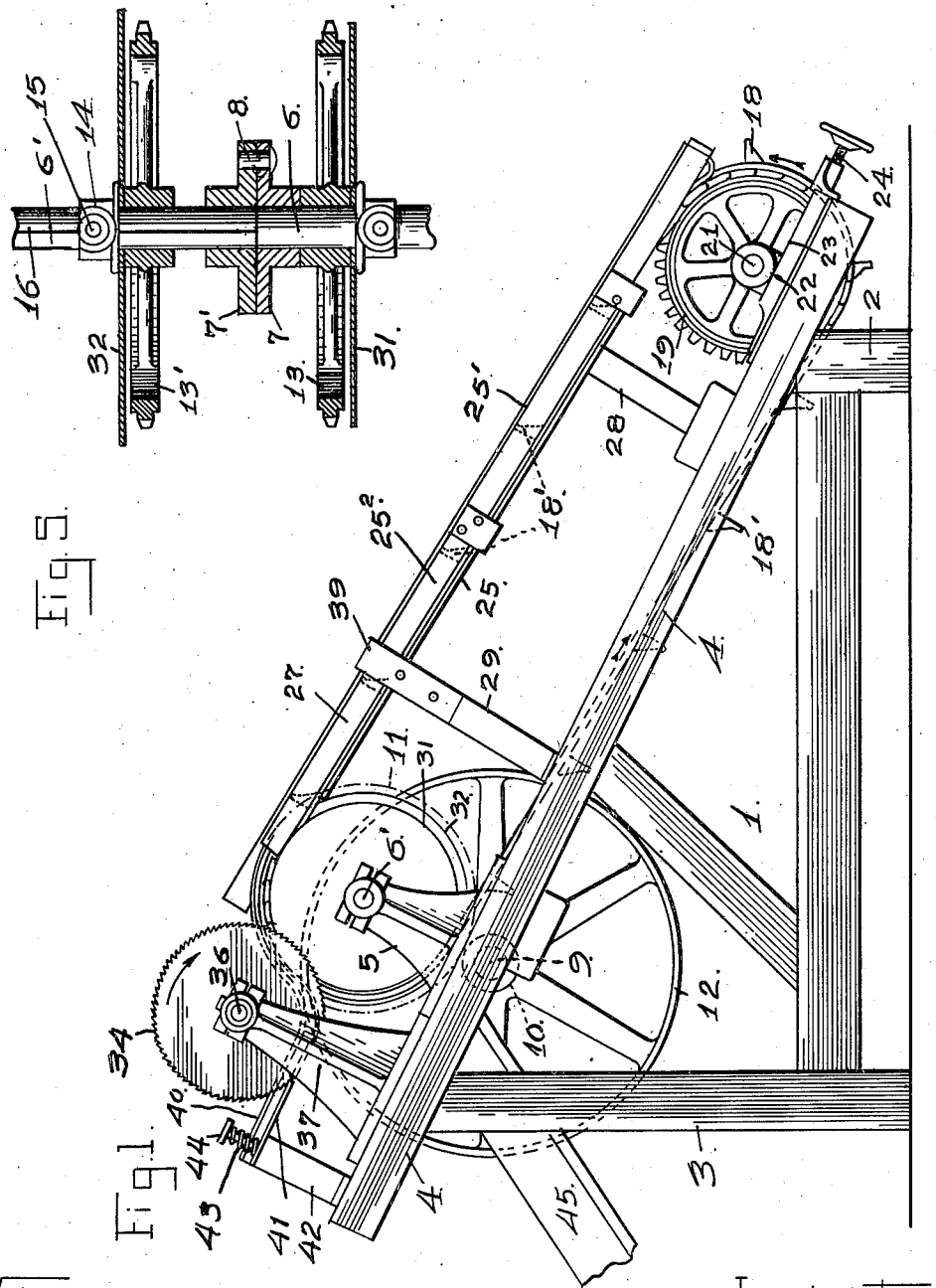

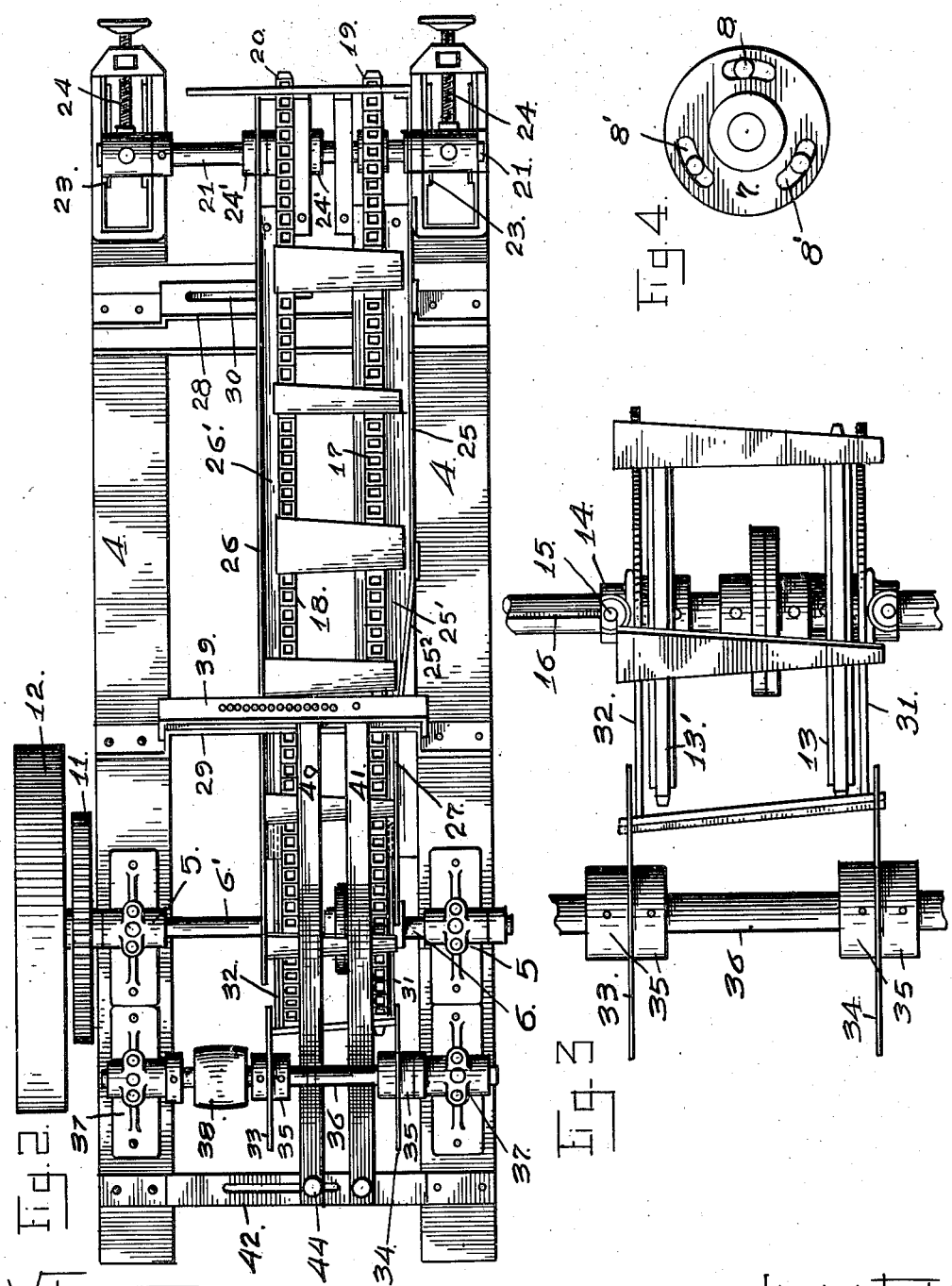

HENRY F. MARTEN, HENRY GRAHN, AND JULIUS C. ANDRESEN, OF SAN FRANCISCO, CALIFORNIA.

AUTOMATIC STAVE-EQUALIZING MACHINE.

1,062,175.  Specification of Letters Patent.  Patented May 20, 1913.

Application filed April 23, 1912. Serial No. 692,597.

*To all whom it may concern:*

Be it known that we, HENRY F. MARTEN, HENRY GRAHN, and JULIUS C. ANDRESEN, citizens of the United States, residing in the city and county of San Francisco and State of California, have invented certain new and useful Improvements in Automatic Stave-Equalizing Machines, of which the following is a specification.

The hereinafter described invention relates to an improved automatic stave equalizing machine and particularly to that type of machine for use in beveling the ends of pail and tub staves, and has for its principal object to provide a machine which after the staves are fed thereto, automatically alines the same, positions the staves to the cutting mechanism so that the ends thereof will be cut the proper angle and length, and automatically ejects the staves from the machine after the ends thereof have been properly shaped.

Another object of the invention is to provide a machine which will accommodate staves of various lengths, to render automatic the work of beveling the ends of staves, to materially expedite the equalizing of staves, and by so doing materially increase the output of a coopering factory and correspondingly reduce the cost of constructing the articles manufactured thereby.

The machine consists of a supporting frame, endless conveyer chains supported by sprockets, carried by suitable shafts journaled in said frame, rotary cutting devices in the path of movement of said conveyer chains, devices on said conveyer chains for engaging the staves to propel the same into contact with said cutting devices, means for guiding the staves as they are propelled toward the cutting devices, devices adjacent to the cutting devices for positioning the staves to the same at an incline that the ends thereof may be correspondingly beveled, and means for discharging the equalized staves from the machine.

With the above mentioned and other objects in view, the invention consists in the construction and novel combination of parts hereinafter fully described, illustrated in the accompanying drawings, and pointed out in the claims hereto appended; it being understood that various changes in the form, proportion, size, and minor details of construction, within the scope of the claims, may be resorted to without departing from the spirit or sacrificing any of the advantages of the invention.

To more fully comprehend the invention, reference should be had to the accompanying drawings, wherein—

Figure 1 is a side elevation of our improved machine disclosing the endless conveyer chains, the driving and supporting wheels therefor, one of the rotary saws at the discharge end of the chains, the lugs on the chains for propelling the staves toward the saws, the means for guiding the staves in their movement toward the saws, and one of the disks loosely mounted on the drive shaft for positioning the staves at an incline to the saws, and the chute through which the equalized staves are discharged. Fig. 2 is a top plan view, disclosing the conveyer chains, the supporting sprockets therefor, the end guides for the staves, the rotary saws within the path of movement of the propelled staves, the spring arms for forcing the staves against the conveyer chains as they are propelled toward the rotary saws, and the disks loosely mounted on the drive shaft for positioning the staves at an incline to the saws. Fig. 3 is a detail view of the drive and driven shafts and the parts associated therewith, the rotary saws carried by their supporting shaft, the disks loosely mounted on the drive shaft, the rotary saws and a stave carried by the endless conveyer chains and in a position after being engaged by the rotary saws. Fig. 4 is a detail view of the drive shaft coupling disclosing the slots therein to permit of alinement of the chains. Fig. 5 is a detail of the mounting of the supporting sprockets and the elevating disks on the drive shaft.

In the drawings, the reference numeral 1 designates a suitable frame formed of front and rear uprights 2 and 3 and parallel spaced forwardly inclined side members 4, the side members forming an inclined bed for supporting the various parts of the machine.

Extending transversely of the supporting bed and mounted to rotate in journals 5 secured to the side members 4 adjacent to the rear ends thereof, is a drive shaft preferably constructed of two sections of material 6 and 6', which are secured together at their inner ends by flanged collars 7 and 7' carried respectively by the corresponding ends of the sections, the collar flanges being detachably secured together by suitable bolts 8, said bolts being seated in cylindrical bores in the flanged collar 7' and extending through arcuate slots 8' in the flange collar 7 to permit of an adjustment as hereinafter described.

The drive shaft receives its movement from a power shaft 9 journaled in bearings below the drive shaft and is provided with a toothed gear 10, which intermeshes with a suitable gear 11 keyed to the outer end of the shaft section 6'; the power shaft carrying at its end a pulley 12 around which is adapted to extend a belt (not shown) which receives its power from any suitable source.

Mounted in spaced relation to each other on the drive shaft are toothed sprockets 13 and 13' which rotate respectively with the sections 6 and 6', the sprocket 13 being rigidly secured to the section 6 adjacent to the collar 7 thereof, and the sprocket 13 being carried by a clamp collar 14, which is capable of longitudinal movement of the section 6', and is keyed to rotate therewith by a pin 15 carried by the collar, the inner end of said pin projecting within a groove 16 extending longitudinally of the shaft section 6'.

Extending around the sprockets 13 and 13' are endless conveyer chains 17 and 18 provided on their outer surface with engaging lugs 18' and which are supported at their opposite ends by suitable toothed sprockets 19 and 20, carried by a driven shaft 21 rotatably mounted in upstanding journals 22, the lower ends of which are adapted to be seated in trackways 23 attached to the front ends of the side members 4. The journals are capable of adjustment longitudinally of the slots by the screw-threaded shafts 24, which extend through suitable screw-threaded openings in the ends of the track-ways 23, the rear ends of the shafts being rotatably seated in the journals 22. Thus it will be observed that the position of the driven shaft may be varied and a takeup is provided for the endless conveyer chains 17 and 18.

The sprocket 19 is keyed to the driven shaft 21 in alinement with the sprocket 13, and the sprocket 20 is loose on the shaft 21, and retained thereon between the adjustable collars 24', which are movable longitudinally of the shaft; thus it will be observed that the sprocket 20 is adjustable longitudinally of its supporting shaft, to be positioned in alinement with the adjustable sprocket 13' on the drive shaft; that the conveyer chains may be set the proper distance apart to accommodate staves of various lengths and that the engaging lugs 18' may be set at the proper angle to each other, through the adjustability of the flanged collars 7 and 7', and the sprocket 20 to properly present staves of various shapes to the cutting mechanism hereinafter described. Extending longitudinally of the conveyer chains 17 and 18 and positioned one on the outer side of each are suitable L-shaped guide rails 25 and 26, the horizontal portions 25' and 26' of which are adapted to extend under the conveyer chains and support the same between the sprockets. The rear vertically extending portion of the guide rail 25 is severed from the horizontal member 25' thereof, and is inwardly bent as at $25^2$ forming a spring finger 27, the tendency of which is to engage one end of the staves as they are conveyed past the same and force the other end thereof into engagement with the vertically extending portion of the guide 26 to properly present the stave to the cutting mechanism hereinafer described.

The guide rails 25 and 26 are supported by suitable brackets 28 and 29 extending transversely of the frame and attached to the bed thereof, the guide rail 25 being secured to the brackets, and the guide rail 26 being capable of adjustment longitudinally of the brackets by a bolt associated with the slots 30 formed therein, so that the guide rail may be moved to correspond with the movement of the adjustable sprockets 13' and 20, to accommodate staves of various lengths.

Loosely mounted on the respective sections 6 and 6' of the drive shaft, and positioned one adjacent to each outer face of the sprockets 13 and 13' are independently rotatable disks 31 and 32, hereinafter termed tilting disks, the diameter of the disk 32 being slightly larger than that of the disk 31, but the diameter of the smaller disk 31 being not less than the diameter of the sprocket 13; the staves when propelled by the endless conveyer chains are forced into contact with the disks, which as the staves travel over the same, tilt or incline the staves to the proper angle to be properly presented to the rotary saws 33 and 34, which will sever the ends of the staves to the proper angle, that when the staves are assembled into a tub or container the sides of the same will be formed with horizontal top and bottom edges.

The rotary saws 33 and 34 are mounted between clamp collars 35 surrounding a shaft 36, the ends of which are journaled in upstanding bearings 37, positioned immediately in rear of the drive shaft journals 5; the shaft 36 being positioned slightly above the horizontal axis of the drive shaft and provided adjacent to one end thereof with a belt pulley 38 around which is adapted to extend a drive belt (not shown) which transmits power to the shaft from any suitable source and rotates the same in the direction of the arrow—Fig. 1. The rotary saws 33 and 34 are positioned on their supporting shaft 36 so as to slightly overlap the edge of the disks 31 and 32, and lie adjacent to the outer faces thereof as in Figs. 1, 2 and 3 of the drawings.

Extending parallel with the conveyer chains 17 and 18 and arranged between the same with their front ends attached to a bracket 39 supported by the bracket 28, are a pair of spring arms 40 and 41 which are downwardly curved about midway of their length, forming an arc corresponding to the curvature of the stave tilting disks, the rear ends of the arms being bent horizontally under the shaft 36 and attached to a bracket 42 and each arm being normally retained in contact therewith by a coiled spring 43 surrounding a suitable securing bolt 44 upwardly projecting from the bracket 42. The spring arms 40 and 41 serve to retain the propelled staves tightly in contact with the tilting disks when the ends thereof are engaged by the rotary saws. The staves after the ends thereof are beveled are carried by the endless chains downwardly past the contacting point of the arms 40 and 41, and the same drop into a chute 45, of any suitable construction, and are carried from the machine.

The machine is constructed to operate in the following manner, and the parts being assembled as in Figs. 1 and 2 of the drawings: Staves of suitable length are placed by the operator on the conveyer chains, and they are engaged by the lugs 18′ and propelled in the direction of the arrow—Fig. 1. The staves in their path of movement engage the spring finger 27 of the guide rail 25, and are forced into contact with the vertical portion of the guide rail 26, the rails positioning the stave in proper position relative to the rotary saws. As the staves are advanced they are carried under the spring arms 40 and 41 which force them tightly against the conveyer chains and while in this position are carried upon the edges of the tilting disks 31 and 32, which incline the staves to the proper angle, so that when they are forced into contact with the rotary saws, which operate in the direction of the arrow—Fig. 1, the ends of the staves will be cut to the proper bevel; after the ends of the staves are cut they drop by gravity into the chute 45.

It will be observed from the above description, that a machine entirely automatic in all of its operations, capable of adjustment to accommodate staves of various lengths and adapted to materially expedite the work of equalizing staves has been provided.

Having thus fully described our invention what is claimed as new and desired to be protected by Letters Patent is:—

1. In a stave equalizing machine, the combination with an endless conveyer for the staves to be equalized, supporting sprockets for the conveyer, rotary cutting devices in the path of movement of the staves and positioned adjacent to certain of said sprockets, and disks loosely mounted adjacent to certain of said sprockets and in coöperative relation with said rotary cutting devices for positioning the staves to the cutters at an inclined position for the proper cutting and beveling of the ends thereof.

2. In a stave equalizing machine, the combination with an endless conveyer for the staves to be equalized, supporting sprockets for the conveyer, rotary cutting devices in the path of movement of the staves and positioned adjacent to certain of said sprockets, and disks of different diameters loosely mounted adjacent to certain of said sprockets and in coöperative relation with said rotary cutting devices for positioning the staves to the cutters at an inclined position for the proper cutting and beveling of the ends thereof.

3. In a stave equalizing machine, the combination with an endless conveyer for the staves to be equalized, supporting sprockets for the conveyer, rotary cutting devices in the path of movement of the staves and positioned adjacent to certain of said sprockets, disks loosely mounted adjacent to certain of said sprockets and in coöperative relation with said rotary cutting devices for positioning the staves to the cutters at an inclined position for the proper cutting and beveling of the ends thereof, and devices for forcing the staves against the disks while the same are being cut.

4. In a stave equalizing machine, the combination with a supporting frame, a pair of endless conveyer chains for the staves to be equalized, supporting sprockets for the conveyer chains, a pair of rotary cutting devices in the path of movement of the staves and positioned adjacent to certain of said sprockets, and a pair of disks loosely mounted adjacent to certain other of said sprockets and in coöperative relation with said rotary cutting devices for positioning the staves to the cutters at an inclined position for the proper cutting and beveling of the ends thereof.

5. In a stave equalizing machine in which the parts thereof are adjustable to accommodate staves of various lengths, the combination of a supporting frame, a pair of parallel spaced endless conveyer chains for the staves to be equalized, parallel spaced supporting sprockets for the conveyer chains, means for imparting movement thereto, a pair of rotary cutting devices in the path of movement of the staves and positioned adjacent to certain of said sprockets, parallel spaced guide rails for guiding the staves in their path of movement toward the cutting devices, a pair of disks of different diameters loosely mounted adjacent to certain other of said sprockets and in coöperative relation with said rotary cutting devices for positioning the propelled staves to the rotary cutters at an inclined position for the proper cutting and beveling of the ends thereof, and a pair of parallel spaced spring pressed arms for forcing the staves against the positioning means while the same are being cut.

In testimony whereof we have signed our names to this specification in the presence of two subscribing witnesses.

HENRY F. MARTEN.
HENRY GRAHN.
JULIUS C. ANDRESEN.

Witnesses:
H. T. DOHERTY,
S. M. DOHERTY.